Sept. 8, 1964  D. O. DAVIES ETAL  3,147,913
GAS TURBINE ENGINE
Filed May 7, 1962
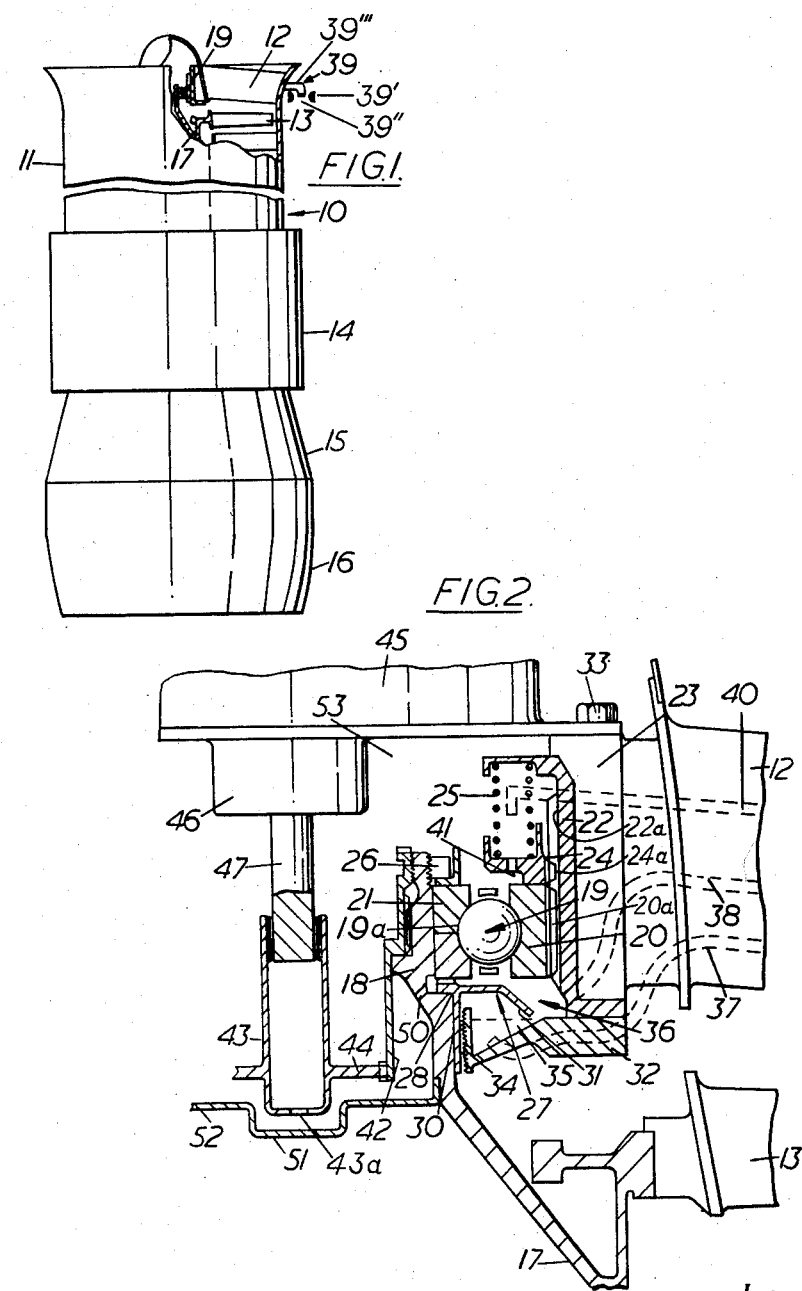
Inventors
David Omrie Davies
Norman Robert Robinson
John Michael Storer Keen
By Cushman, Darby & Cushman
Attorneys

United States Patent Office 3,147,913
Patented Sept. 8, 1964

3,147,913
GAS TURBINE ENGINE
David Onuri Davies and Norman Robert Robinson, Derby, and John Michael Storer Keen, Allestree, England, assignors to Rolls-Royce Limited, Derby, England, a company of Great Britain
Filed May 7, 1962, Ser. No. 192,708
Claims priority, application Great Britain May 10, 1961
13 Claims. (Cl. 230—207)

This invention concerns a gas turbine engine.

According to the present invention there is provided a gas turbine engine having a shaft which carries the compressor and the turbine of the engine, a bearing within which the shaft is rotatably mounted, means for supplying a quantity of lubricant to the bearing, a bearing housing chamber in which the bearing is housed, a sump chamber to which may drain lubricant which has passed through the bearing, and at least one ejector pump for pumping lubricant out of the said sump chamber and for maintaining a low pressure within the bearing housing chamber.

Thus a single common ejector pump may be employed for pumping lubricant out of the sump chamber and for maintaining a low pressure within the bearing housing chamber. Since the ejector pump will, in operation, be working continuously and the removal of lubricant from the sump chamber will only be intermittent, it will be appreciated that this single common ejector pump will be able to withdraw air from the bearing housing chamber.

Alternatively two ejector pumps may, if desired, be employed, one of the ejector pumps being provided for pumping lubricant out of the sump chamber and the other ejector pump being provided for maintaining a low pressure within the bearing housing chamber.

Preferably the said bearing is an engine front bearing.

The engine front bearing may be supported from the engine casing by a plurality of angularly spaced apart vanes, the said bearing housing and sump chambers communicating with their ejector pump or pumps by ducting which passes through one or more of the said vanes. Thus the said vanes may be constituted by inlet guide vanes and/or by struts disposed forwardly of inlet guide vanes.

The said shaft may be arranged to drive a fuel pump through a drive connection, lubricant supplied to the fuel pump being caused to flow so as to lubricate said drive connection and thereafter to pass to the said bearing housing chamber.

The bearing preferably has an outer race which is splined within a bearing housing member to permit differential axial expansion between the said shaft and the bearing housing member, resilient means being provided to urge the outer race in a downstream direction to oppose the thrust exerted on the said shaft by the compressor.

The invention also comprises an aircraft provided with a gas turbine engine as set forth above, said engine being vertically mounted and adapted for use as a vertical lift engine.

The term "vertical lift engine" as used in this specification is intended to indicate an engine which is adapted to produce vertical lift forces on an aircraft independently of those generated aerodynamically by forward flight of the aircraft.

Additionally, the invention includes an aircraft provided with a gas turbine engine as set forth above, said engine being horizontally mounted and adapted for use as a forward propulsion engine.

The invention is illustrated, merely by way of example, in the accompanying drawings, in which:

FIGURE 1 is an elevation partly in section of a gas turbine engine according to the present invention, and FIGURE 2 is a broken away section showing part of the structure of the gas turbine engine of FIGURE 1.

Referring to the drawings, a vertical lift gas turbine engine 10 for an aircraft comprises an engine casing 11 within which are mounted in flow series hollow inlet guide vanes 12, a multistage axial flow compressor 13, combustion equipment 14, and a single stage axial turbine 15, the turbine exhaust gases being directed to atmosphere through a jet pipe 16. The compressor 13 and turbine 15 are mounted on a common, vertically arranged shaft 17 having a front portion 18. The front portion 18 is rotatably mounted within a front thrust bearing 19 which is provided with a plurality of angularly spaced ball bearings 19a.

The front bearing 19 has an outer race 20 and a split inner race 21 which is fixed to the shaft 17, the ball bearings 19a being disposed between and cooperating in thrust transmitting relationship with the outer and inner races 20, 21. The outer race 20 has an outwardly facing surface provided with a set of axially extending splines 20a which slidably engage a set of axially extending splines 22a, the splines 22a being provided on the inwardly facing suface of a fixed, hollow inner hub member 22 secured within an outer hub member 23. The shaft 17, as shown in FIGURE 2 of the drawing, is axially slidably mounted in the inner hub member 22. The outer hub member 23 is supported from the casing 11 by the inlet guide vanes 12. The hub members 22, 23 and inlet guide vanes 12 may be of reinforced synthetic resin material and may be bonded to each other.

An upwardly opening annular channel member 24, which is positioned above the outer race 20, has an outwardly facing surface provided with a set of axially extending splines 24a, the splines 24a slidably engaging the splines 22a as shown in FIGURE 2 of the drawings. Six coil springs 25 bear against the inner hub member 22 and channel member 24 so as to load the outer race 20 in a downstream direction, i.e. in a direction to oppose the thrust exerted on the shaft 17 by the compressor 13. As the engine speed increases, the load exerted by the springs 25 will increase, the splining of the outer race 20 to the inner hub member 22 catering for differential expansion between the latter and the shaft 17.

The inner race 21 of the bearing 19 is located between a nut 26, which is threaded onto the shaft portion 18, and an annular member 27 which is forced against a shoulder 28 of the shaft portion 18.

The annular member 27 has an axially extending portion 30, which lies against the shaft portion 18, and a radially extending flange portion 31.

A flange member 32, which is secured by bolts 33 to the outer hub member 23, has a threaded axially extending part 34. The latter constitutes, in effect, a seal for sealing the portion 30 to the flange member 32.

The flange portion 31 forms with the flange member 32 a sump chamber 35 into which may drain oil which has passed through the bearing 19. The flange portion 31 also forms with the bearing 19 a chamber 36 which communicates with the sump chamber 35.

Pipes 37, 38, which pass through the interior of one of the inlet guide vanes 12, respectively communicate at one end with the sump chamber 35, and the chamber 36 and communicate at their other ends with ejector pumps 39 (FIG. 1) for pumping oil from the sump chamber 35, and air from the chamber 36, thereby maintaining the pressure within the chamber 36 lower than the pressure in the working duct of the engine.

The ejector pumps 39, which are schematically shown in FIGURE 1, are of the pressure fluid operated venturi type having a venturi 39′ and a discharge indicated at 39″. Compressed air in the pipe 39‴ is tapped from a suitable source such as from the downstream end of the compressor 13. The air and/or oil is drawn from the chambers 35 and 36 through the pipes 37 and 38, respectively, and is discharged through the discharge 39" to atmosphere.

There also passes through the said inlet guide vane 12 a pipe 40 through which a single shot of oil may be introduced to the upstream side of the channel member 24. This shot of oil is then metered through drillings 41 in the channel member 24 and passes through the bearing 19 to the chambers 36, 35. The oil, in passing through the bearing 19 flows radially outwardly from the ball bearings 19a under centrifugal action onto the outer race 20 so as to lubricate the splines 20a, 22a.

Splined within the shaft portion 18 is a sleeve 42. A quill shaft 43 has a flange 44 which is splined within the sleeve 42. A fuel supply control unit 45 for the engine 10 has a fuel pump 46 which is driven by a shaft 47, the shaft 47 being axially splined within the upper end of the quill shaft 43.

Oil is supplied (by means not shown) to lubricate the fuel pump 46. Some of this oil passes, in the form of an oil mist, to the interior of the sleeve 42 and thence outwardly through the splines between the latter and the flange 44. This oil is then forced centrifugally through drillings 50 in the shaft portion 18 to the chambers 36, 35 from which it will be removed by the ejector pumps 39.

The bottom, or downstream, end of the quill shaft 43 extends into an upwardly opening sump pocket 51 formed in a radially extending rotary wall member 52 which is secured to the shaft 17. When the engine 10 is shut down, oil drains into the pocket 51 and, on starting the engine, this oil will be forced centrifugally through an aperture 43a (FIGURE 2 of the drawings) in the bottom end of the quill shaft 43 and up the interior of the quill shaft 43 so as to lubricate the splines between the latter and the shaft 47.

The chamber 36 forms part of a bearing housing chamber 53 which is formed by the fuel supply control unit 45, the members 22, 23, 32 and the wall member 52.

When the engine 10 is started, a depression can occur at the engine intake which could cause lubricating oil used in the lubrication of the bearing 19 and qiull shaft 43 to be sucked out through the seal 34 and into the main fluid stream passing through the engine. This danger is however avoided in the construction shown in the drawings by reason of the fact that the air pressure within the chamber 53 housing the bearing 19 is maintained at a pressure lower than the pressure of the main fluid stream passing through the engine.

Although the engine 10 is shown in the drawings as a vertical lift engine of an aircraft, the invention is also applicable to horizontally mounted engines which are adapted to be used as forward propulsion engines of an aircraft.

We claim:

1. A gas turbine engine comprising a compressor, a turbine, a shaft on which the compressor and turbine are mounted, a bearing within which the shaft is rotatably mounted, means for supplying a quantity of lubricant to the bearing, a bearing housing chamber in which the bearing is housed, a sump chamber to which may drain lubricant which has passed through the bearing, and at least one pressure fluid operated venturi ejector pump for pumping lubricant out of the said sump chamber and for maintaining a low pressure within the bearing housing chamber, said pressure fluid operated venturi ejector pump having a discharge to atmosphere.

2. A gas turbine engine comprising a compressor, a turbine, a shaft on which the compressor and turbine are mounted, a bearing within which the shaft is rotatably mounted, means for supplying a quantity of lubricant to the bearing, a bearing housing chamber in which the bearing is housed, a sump chamber to which may drain lubricant which has passed through the bearing, and two pressure fluid operated venturi ejector pumps one of which pumps lubricant out of the said sump chamber and the other of which maintains a low pressure within the bearing housing chamber, each of said pressure fluid operated venturi ejector pumps having a discharge to atmosphere.

3. A gas turbine engine comprising a compressor, a turbine, a shaft on which the compressor and turbine are mounted, an engine front bearing within which the shaft is rotatably mounted, means for supplying a quantity of lubricant to the engine front bearing, a bearing housing chamber in which the engine front bearing is housed, a sump chamber to which may drain lubricant which has passed through the engine front bearing, and at least one pressure fluid operated venturi ejector pump for pumping lubricant out of the said sump chamber and for maintaining a low pressure within the bearing housing chamber, said pressure fluid operated venturi ejector pump having a discharge to atmosphere.

4. A gas turbine engine comprising an engine casing, an engine front bearing mounted within said casing, a plurality of angularly spaced apart vanes which support the engine front bearing from the engine casing, a shaft rotatably mounted in the engine front bearing, a compressor and a turbine mounted on said shaft, means for supplying a quantity of lubricant to the engine front bearing, a bearing housing chamber in which the engine front bearing is housed, a sump chamber to which may drain lubricant which has passed through the bearing, at least one pressure fluid operated venturi ejector pump for pumping lubricant out of the said sump chamber and for maintaining a low pressure within the bearing housing chamber, said pressure fluid operated venturi ejector pump having a discharge to atmosphere, and ducting which passes through at least one of said vanes and which communicates with the said bearing housing and sump chambers and with the ejector pump.

5. A gas turbine engine as claimed in claim 4 in which the said vanes are inlet guide vanes.

6. A gas turbine engine comprising an engine casing, an engine front bearing mounted within said casing, a plurality of angularly spaced apart vanes which support the engine front bearing from the engine casing, a shaft rotatably mounted in the engine front bearing, a compressor and a turbine mounted on said shaft, means for supplying a quantity of lubricant to the engine front bearing, a bearing housing chamber in which the engine front bearing is housed, a sump chamber to which may drain lubricant which has passed through the bearing, at least one pressure fluid operated venturi ejector pump for pumping lubricant out of the said sump chamber and for maintaining a low pressure within the bearing housing chamber, said pressure fluid operated venturi ejector pump having a discharge to atmosphere, ducting which passes through at least one of said vanes and which communicates with the said bearing housing and sump chambers and with the ejector pump, a lubricated fuel pump, a drive connection between the said shaft and the fuel pump and arranged to receive lubrication from said fuel pump, and fluid transfer means between said fuel pump and said bearing housing chamber to ensure that lubricant supplied to the fuel pump is caused to flow so as to lubricate said drive connection and thereafter to pass to the said bearing housing chamber.

7. A gas turbine engine as claimed in claim 6 in which the bearing has an outer race which is splined within a bearing housing member to permit differential axial expansion between the said shaft and the bearing housing member, and resilient means to urge the outer race in a downstream direction to oppose the thrust exerted on the said shaft by the compressor.

8. A gas turbine engine comprising a compressor, a turbine, a main shaft on which the compressor and turbine are mounted, a fixed hollow hub, a thrust bearing rotatably mounting the said shaft in the said hub, a bearing housing chamber in which the bearing is housed, said hub having an inwardly facing surface provided with a first set of axially extending splines, said bearing comprising an inner race fixed to said shaft, an outer race having an outwardly facing surface provided with a second set of axially extending splines slidably engaging said first set, a plurality of angularly spaced rolling elements disposed between and cooperating in thrust-transmitting relationship with said inner and outer races, whereby said shaft is axially slidably mounted in said hub, means for supplying lubricant to said rolling elements, such lubricant flowing radially outwardly from the rolling elements under centrifugal action onto said outer race and lubricating said sets of splines, a sump chamber to which may drain lubricant which has passed through the bearing, and at least one pressure fluid operated venturi ejector pump for pumping lubricant out of the said sump chamber and for maintaining a low pressure within the bearing housing chamber, said pressure fluid operated venturi ejector pump having a discharge to atmosphere.

9. A gas turbine engine as claimed in claim 8 including spring means co-operating with both said hub and said outer race and urging the latter axially relatively to the hub.

10. A gas turbine engine comprising a compressor, a turbine, a substantially vertical main shaft on which the compressor and turbine are mounted, a fixed hollow hub, a thrust bearing rotatably mounting the said shaft in the said hub, a bearing housing chamber in which the bearing is housed, said hub having an inwardly facing surface provided with a first set of axially extending splines, said bearing comprising an inner race fixed to said shaft, an outer race having an outwardly facing surface provided with a second set of axially extending splines slidably engaging said first set, a plurality of angularly spaced rolling elements disposed between and cooperating in thrust-transmitting relationship with said inner and outer races, whereby said shaft is axially slidably mounted in said hub, an upwardly opening annular channel member, said channel member having an outwardly facing surface provided with a third set of axially extending splines slidably engaging said first set, said channel member being positioned above said outer race, means for supplying lubricant to said channel member, said channel member having a bottom wall in which a metering orifice is provided for metering lubricant to said rolling elements, such lubricant flowing radially outwardly from the rolling elements under centrifugal action onto said outer race and lubricating said sets of splines, a sump chamber to which may drain lubricant which has passed through the bearing, and at least one pressure fluid operated venturi ejector pump for pumping lubricant out of the said sump chamber and for maintaining a low pressure within the bearing housing chamber, said pressure fluid operated venturi ejector pump having a discharge to atmosphere.

11. A gas turbine engine as claimed in claim 10 including spring means co-operating with both said hub and said channel member and urging the latter axially relatively to the hub against said outer race, whereby the outer race is spring-urged axially relatively to the hub.

12. A gas turbine engine comprising a compressor, a turbine, a main shaft on which the compressor and turbine are mounted, a fixed hollow hub, a thrust bearing rotatably mounting the said shaft in the said hub, a bearing housing chamber in which the bearing is housed, said hub having an inwardly facing surface provided with a first set of axially extending splines, said bearing comprising an inner race fixed to said shaft, an outer race having an outwardly facing surface provided with a second set of axially extending splines slidably engaging said first set, a plurality of angularly spaced rolling elements disposed between and cooperating in thrust-transmitting relationship with said inner and outer races, whereby said shaft is axially slidably mounted in said hub, a fuel pump carried by said hub and having a drive input shaft coaxial with said main shaft, spline connection means drivingly but relatively axially slidably connecting said main shaft to said drive input shaft, means for supplying lubricant to said rolling elements, and to said spline connection means, such lubricant flowing radially outwardly from the rolling elements under contrifugal action onto said outer race and lubricating said sets of splines, a sump chamber to which may drain lubricant which has passed through the bearing, and at least one pressure fluid operated venturi ejector pump for pumping lubricant out of the said sump chamber and for maintaining a low pressure within the bearing housing chamber, said pressure fluid operated venturi ejector pump having a discharge to atmosphere.

13. A gas turbine engine as claimed in claim 12 in which said main shaft defines therein an upwardly opening lubricant sump in which lubricant supplied to said spline connection means collects, and said spline connection means includes a quill shaft depending into said lubricant sump, and a spline connection drivingly but relatively axially slidably connecting the upper end of said quill shaft to said drive input shaft, lubricant in said sump rising out the interior of said quill shaft by centrifugal action to lubricate said spline connection.

References Cited in the file of this patent

UNITED STATES PATENTS

| | | |
|---|---|---|
| 2,474,258 | Kroon | June 28, 1949 |
| 2,531,411 | Davenport | Nov. 28, 1950 |
| 2,609,065 | Douglas | Sept. 2, 1952 |
| 2,693,248 | Gaubatz et al. | Nov. 2, 1954 |
| 2,804,280 | Wheatley | Aug. 27, 1957 |

FOREIGN PATENTS

| | | |
|---|---|---|
| 764,860 | Great Britain | Jan. 2, 1957 |